INVENTOR
Samuel A. Huffman
by his attorneys
Stebbins, Blenko & Parmelee

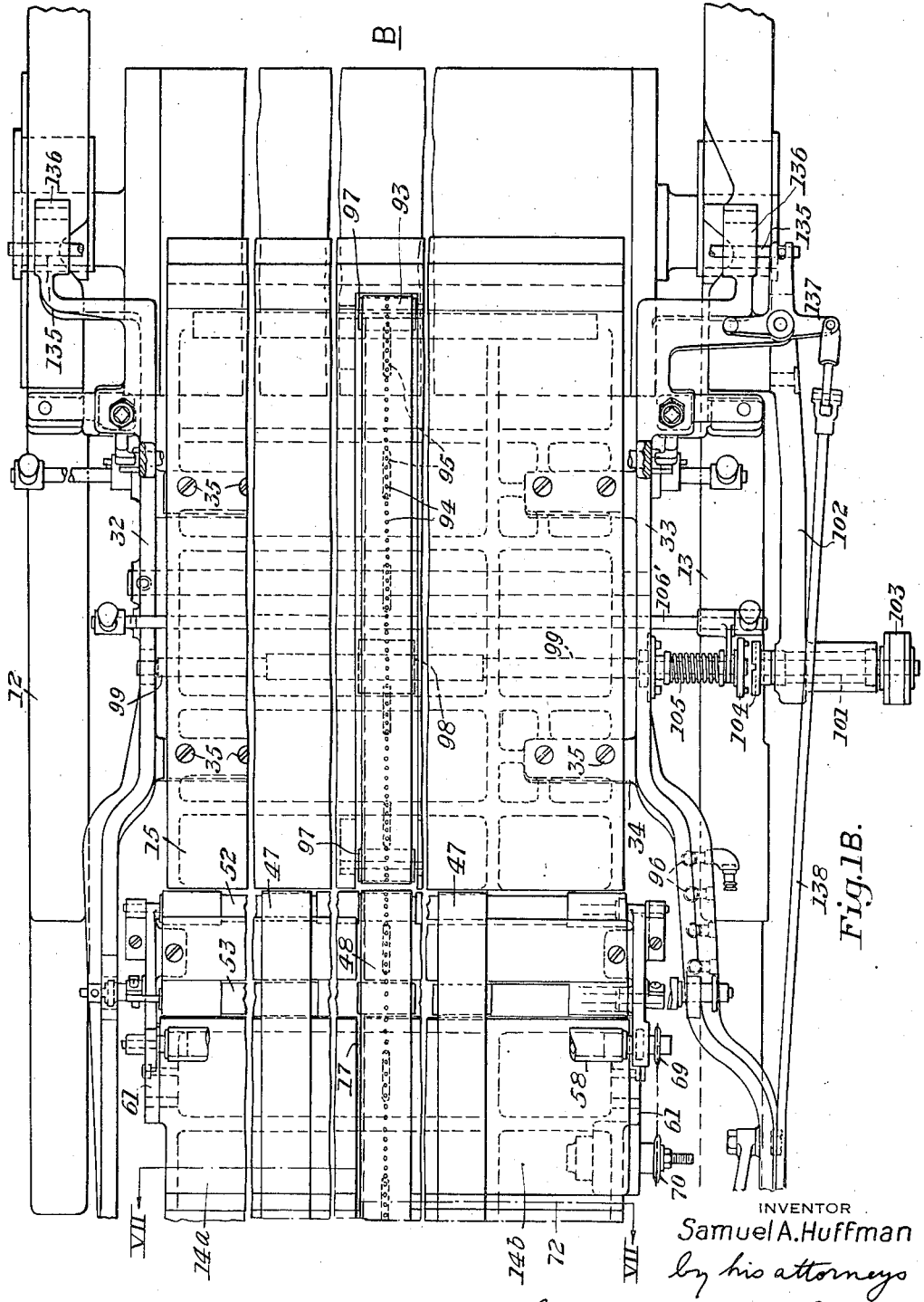

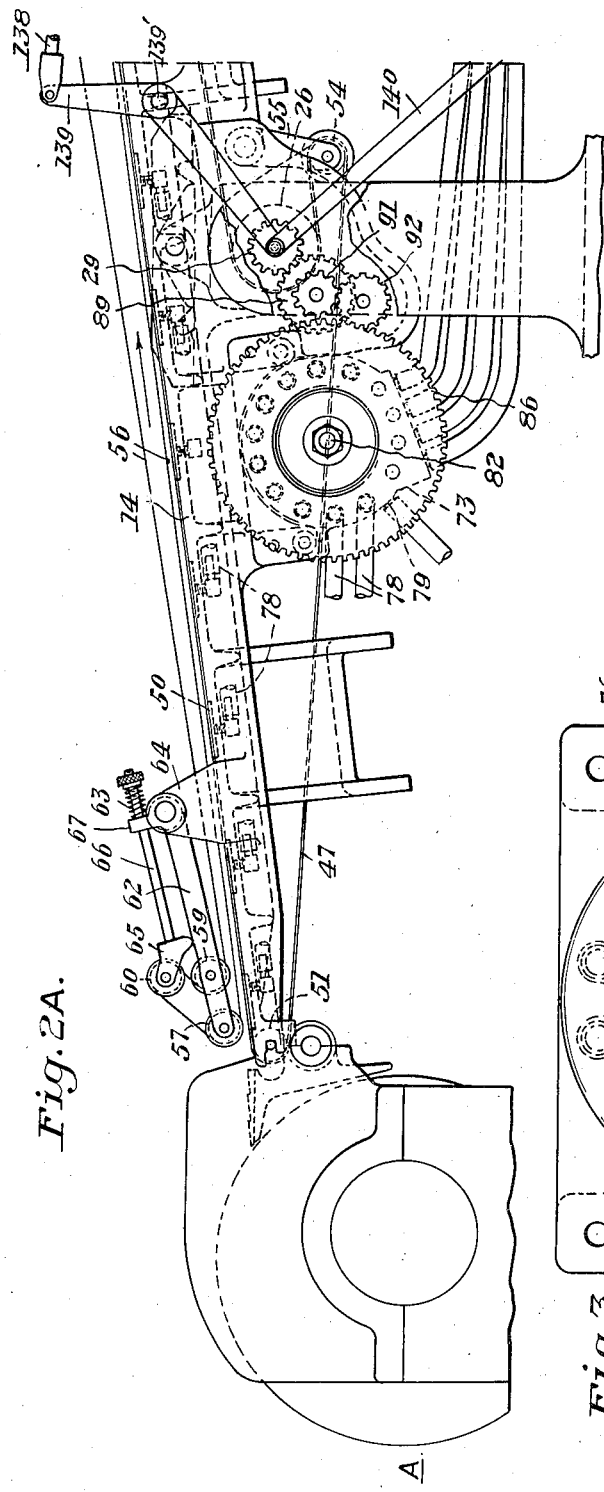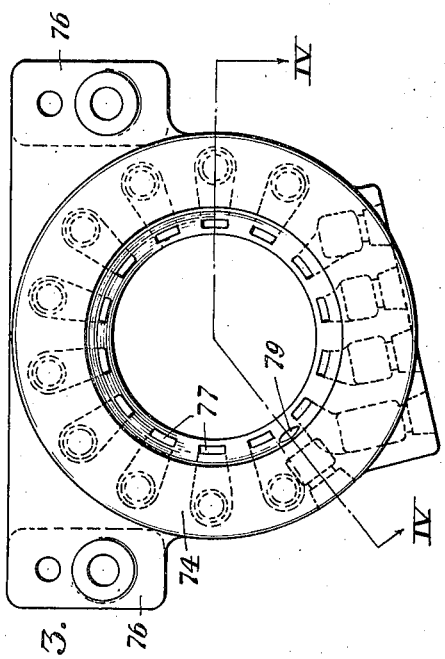

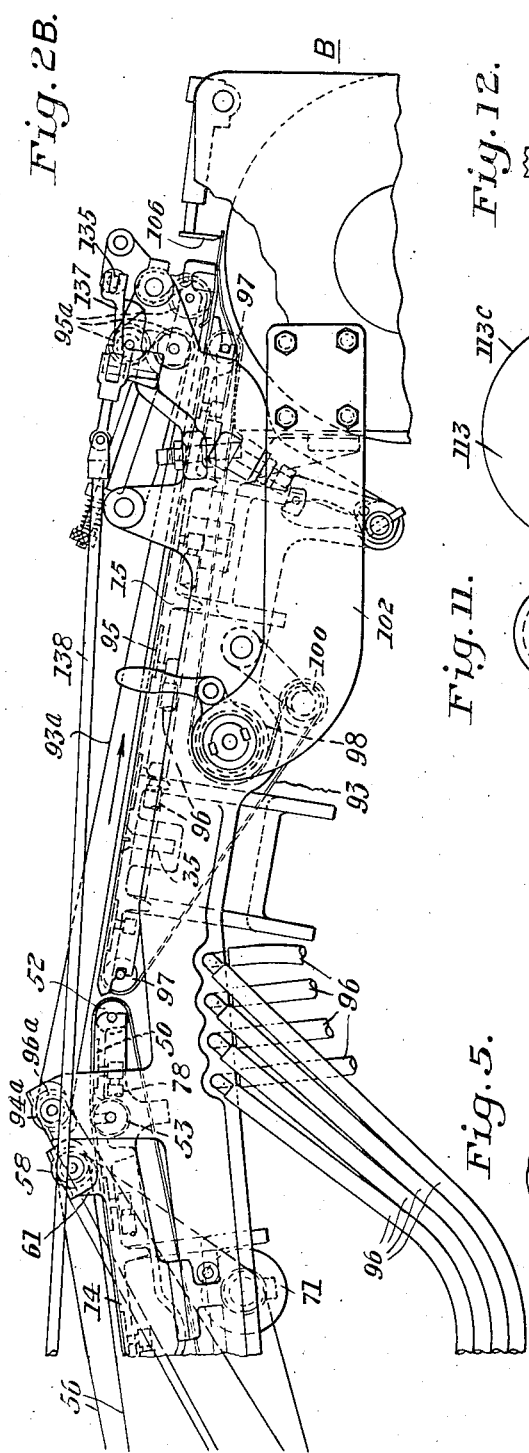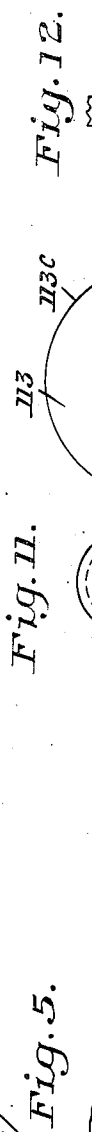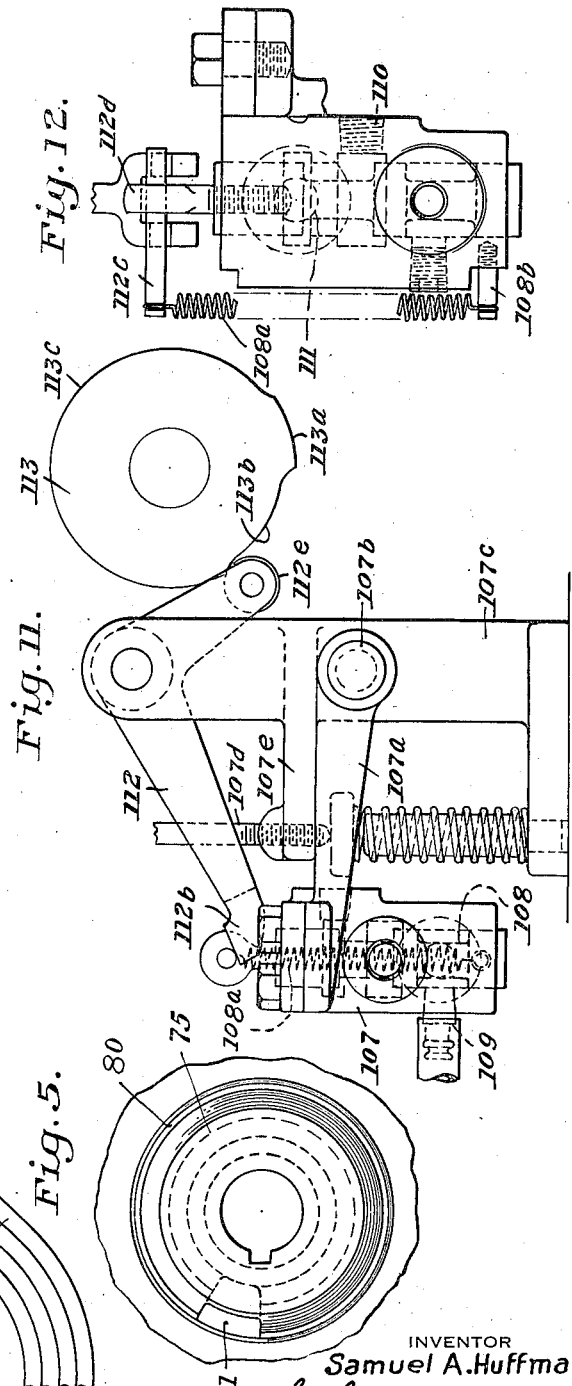
INVENTOR
Samuel A. Huffman
by his attorneys
Stebbins, Blenko & Parmelee Sept. 30, 1941.                S. A. HUFFMAN                    2,257,117
                          SHEET HANDLING MECHANISM
                           Filed March 31, 1938        17 Sheets-Sheet 5
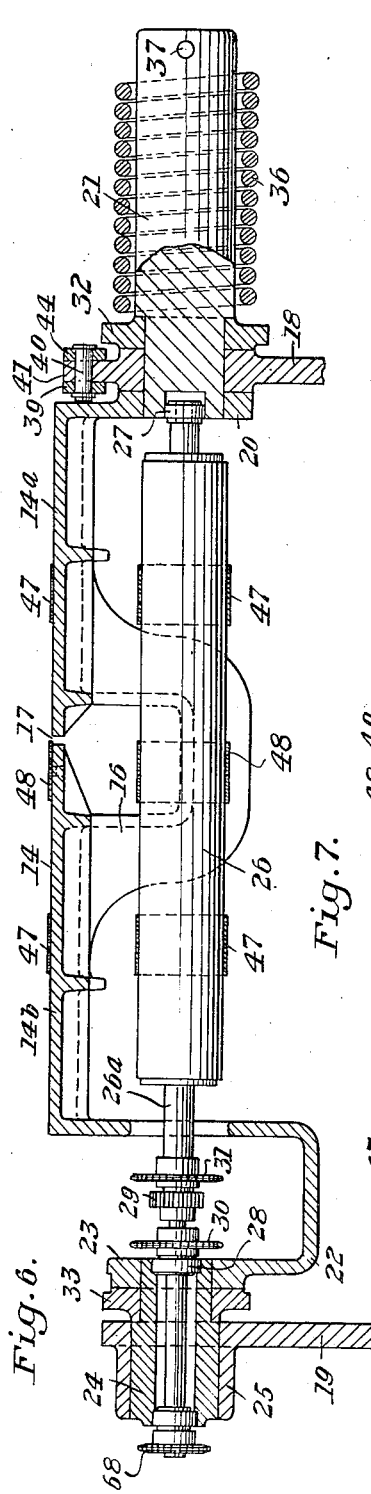
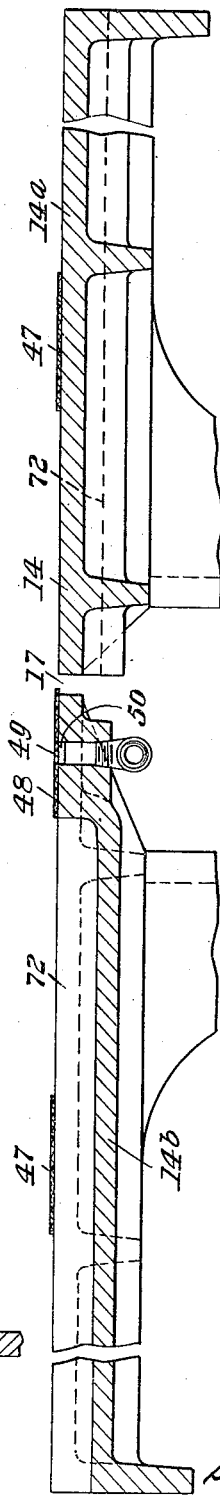
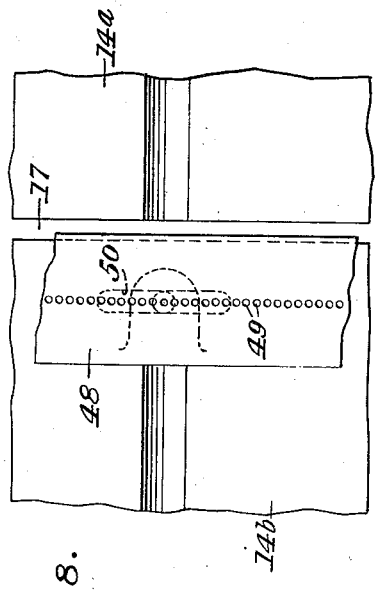
INVENTOR
Samuel A. Huffman
by his attorneys
Stebbins, Blenko & Parmelee

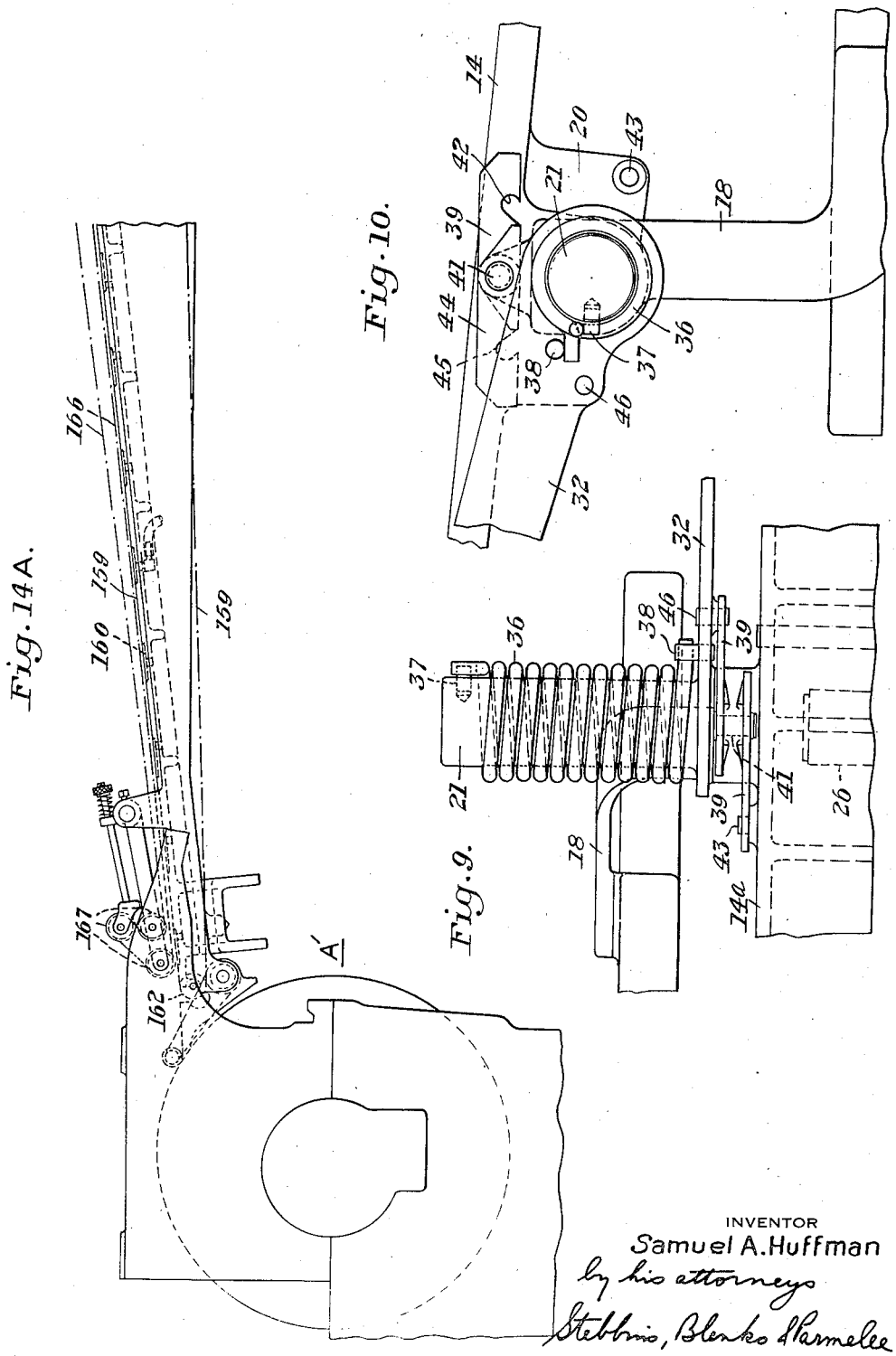

Sept. 30, 1941. S. A. HUFFMAN 2,257,117
SHEET HANDLING MECHANISM
Filed March 31, 1938 17 Sheets-Sheet 7

INVENTOR
Samuel A. Huffman
by his attorneys
Stebbins, Blenko & Parmelee

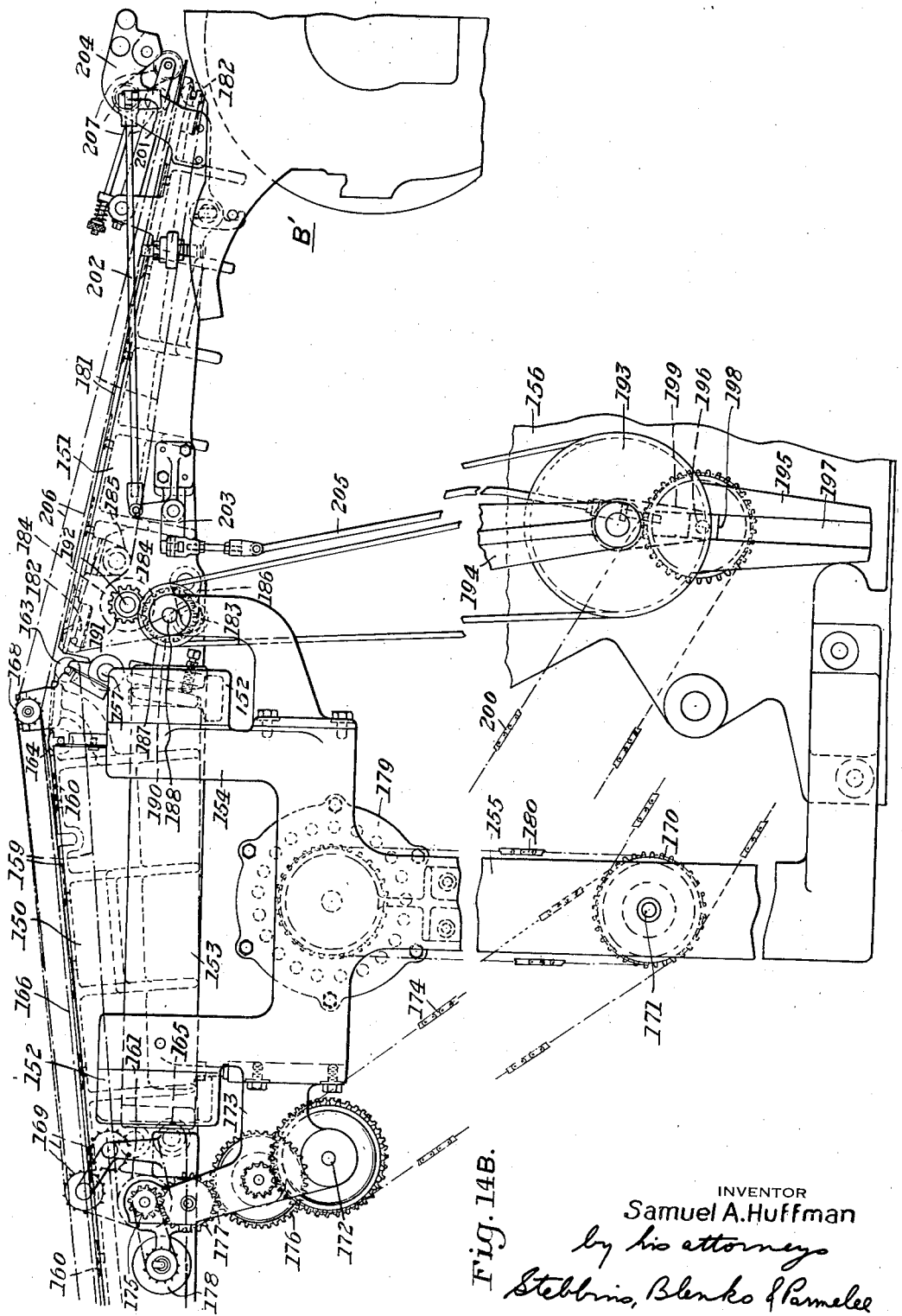

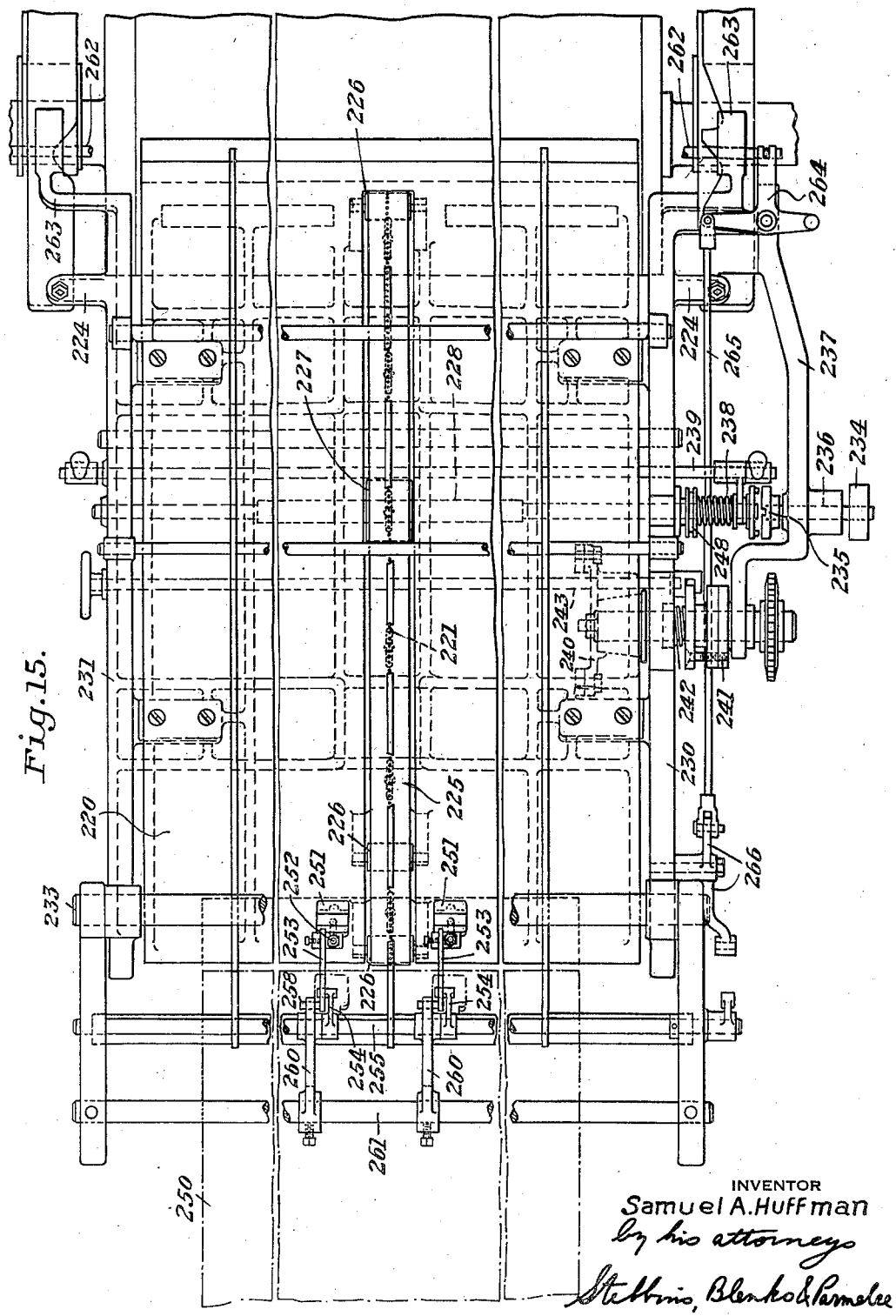

Sept. 30, 1941.   S. A. HUFFMAN   2,257,117
SHEET HANDLING MECHANISM
Filed March 31, 1938   17 Sheets-Sheet 10
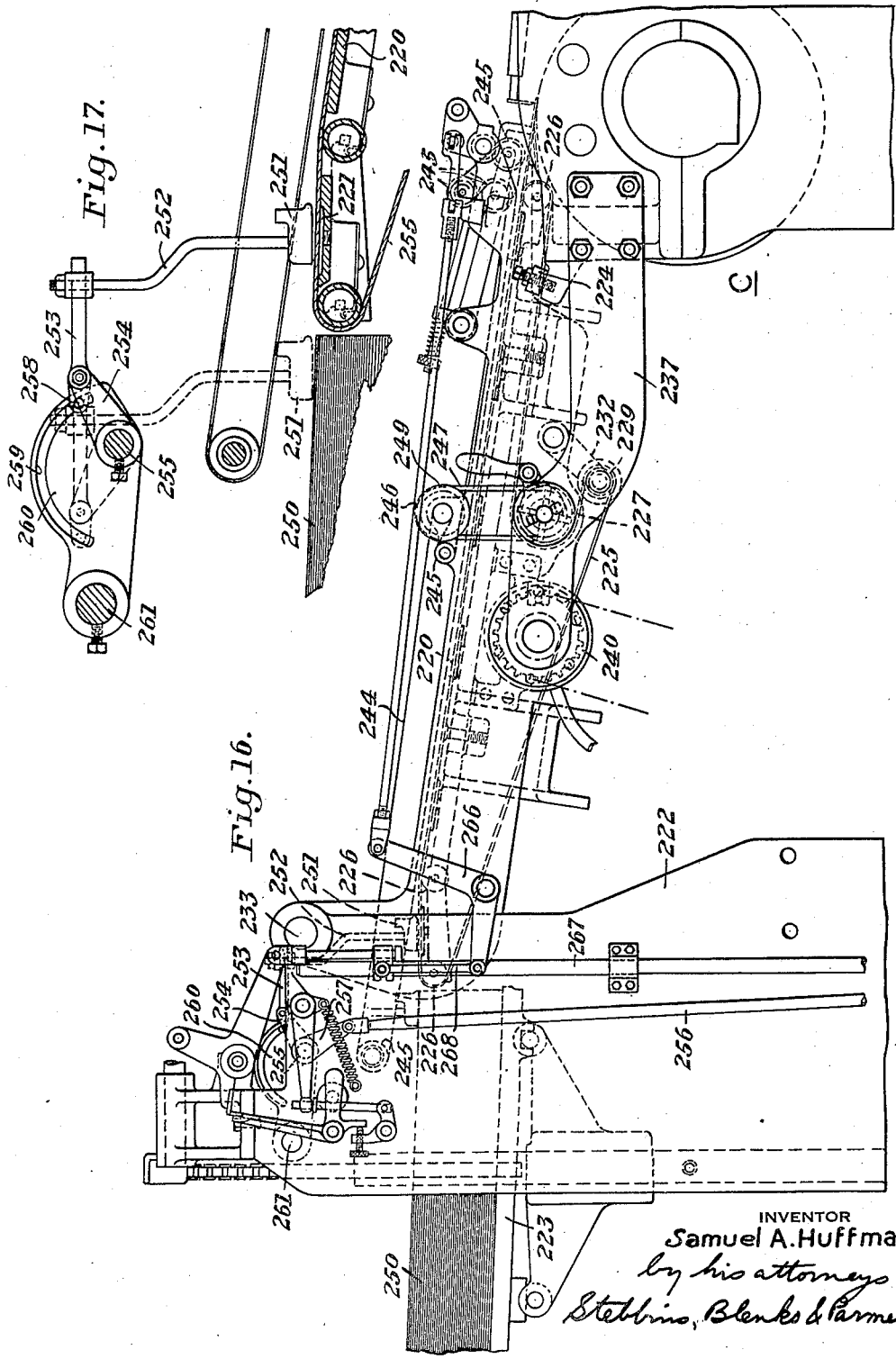
INVENTOR
Samuel A. Huffman
by his attorneys
Stebbins, Blenko & Parmelee

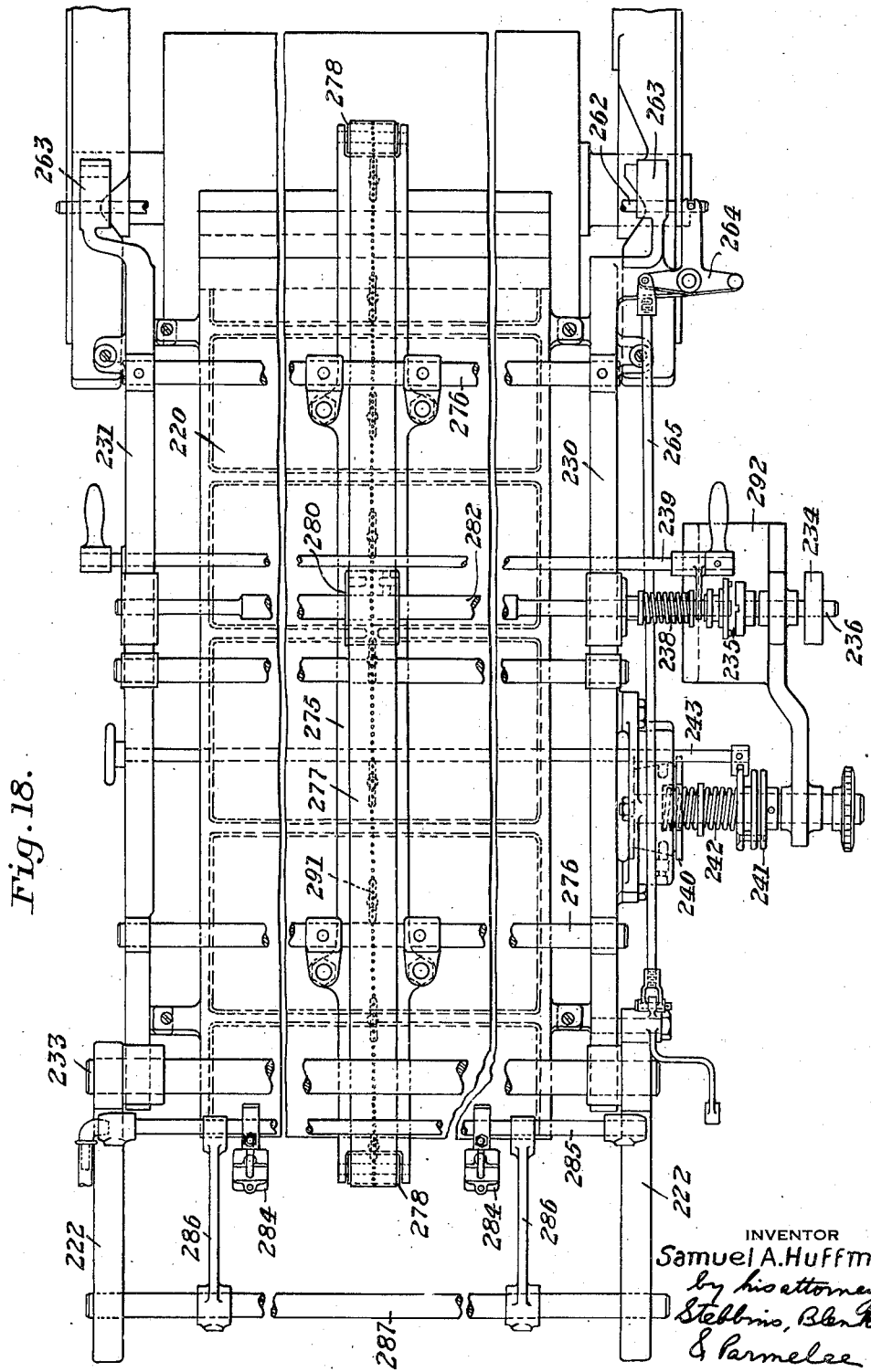

Sept. 30, 1941.                S. A. HUFFMAN                 2,257,117
                          SHEET HANDLING MECHANISM
                   Filed March 31, 1938        17 Sheets-Sheet 12

INVENTOR
Samuel A. Huffman
by his attorneys
Stebbins, Blenko
& Parmelee

Sept. 30, 1941.                S. A. HUFFMAN                2,257,117
                        SHEET HANDLING MECHANISM
                  Filed March 31, 1938        17 Sheets-Sheet 15

INVENTOR
Samuel A. Huffman
by his attorneys
Stebbins, Blenko & Parmelee

Sept. 30, 1941.   S. A. HUFFMAN   2,257,117
SHEET HANDLING MECHANISM
Filed March 31, 1938   17 Sheets-Sheet 16

INVENTOR
Samuel A. Huffman
by his attorneys
Stebbins, Blenko & Parmelee

Sept. 30, 1941.

S. A. HUFFMAN 2,257,117

SHEET HANDLING MECHANISM

Filed March 31, 1938

INVENTOR
Samuel A. Huffman
his attorneys

Patented Sept. 30, 1941

2,257,117

UNITED STATES PATENT OFFICE 2,257,117

SHEET HANDLING MECHANISM

Samuel A. Huffman, Ben Avon, Pa., assignor to Miller Printing Machinery Co., Pittsburgh, Pa., a corporation of Pennsylvania Application March 31, 1938, Serial No. 199,167

15 Claims. (Cl. 271—46)

This invention relates to the art of handling sheets, for example the transfer of sheets singly from one processing machine (such as a printing press or the like) to another, the feeding of sheets singly to a processing machine (see copending application Serial No. 294,166) or receiving sheets from such machine and disposing of them in suitable condition for further handling (see copending application Serial No. 299,309).

The problem of handling sheets is encountered in various industrial operations. The best known of such applications is the feeding of sheets to a printing press and the delivery of sheets therefrom. This invention is particularly adapted to such application and will be described with special reference thereto, although the invention is not limited to this application but has other uses as well.

Sheet handling mechanisms for printing presses have heretofore included reciprocating members of considerable mass. Any attempt to operate such equipment at high speed introduces objectionable stress, shock and vibration. It is an object of the invention, therefore, to improve generally on sheet handling mechanisms as known heretofore, and particularly to avoid reciprocating parts to a large degree, thus permitting high speed operation without the aforementioned objectionable stress, shock and vibration. In accordance with the invention, I employ endless belts for advancing sheets successively. The belts travel over a suitably formed table or other support and I provide vacuum means for progressively holding a sheet in contact with the travelling belts. The application of vacuum to the sheet at each point in its path of travel is controlled automatically to insure the desired movement without crumpling or other injury to the sheet.

The invention may take numerous different forms, and the following detailed description will cover only a few of the numerous possibilities. Among the forms of the invention to be described herein with reference to the accompanying drawings are a conveyor adapted to receive sheets successively from one printing press and deliver them to a second press arranged in tandem with the first mentioned press for a further printing operation; a sheet handling mechanism adapted to feed sheets singly from a pile to a press; and a conveyor mechanism adapted to receive sheets from a press and deliver them to a suitable pile support. Several modifications of these applications will also be described. In the drawings:

Figs. 1A and 1B together constitute a plan view of one form of conveyor mechanism for receiving sheets from one press and transferring them to a second press arranged in tandem therewith;

Figs. 2A and 2B together constitute a side elevation of the conveyor mechanism;

Fig. 3 is an elevation of the stator of a rotary valve employed to control the vacuum applied progressively to the sheets for holding them in contact with the conveyor belts;

Fig. 4 is a sectional view through the stator and rotor of the valve along the line IV—IV of Fig. 3;

Fig. 5 is a partial elevation of the rotor of the valve;

Fig. 6 is a transverse sectional view taken along the line VI—VI of Fig. 1A;

Fig. 7 is a transverse sectional view taken along the line VII—VII of Fig. 1B;

Fig. 8 is a partial plan view to enlarged scale;

Fig. 9 is a partial plan view of a portion of the structure omitted from Fig. 1A;

Fig. 10 is an end view thereof;

Fig. 11 is an elevation of a reciprocating piston valve which serves progressively to release the vacuum holding the sheet to the travelling belts as the sheet approaches the cylinder of the second press;

Fig. 12 is an end view thereof;

Figure 19:
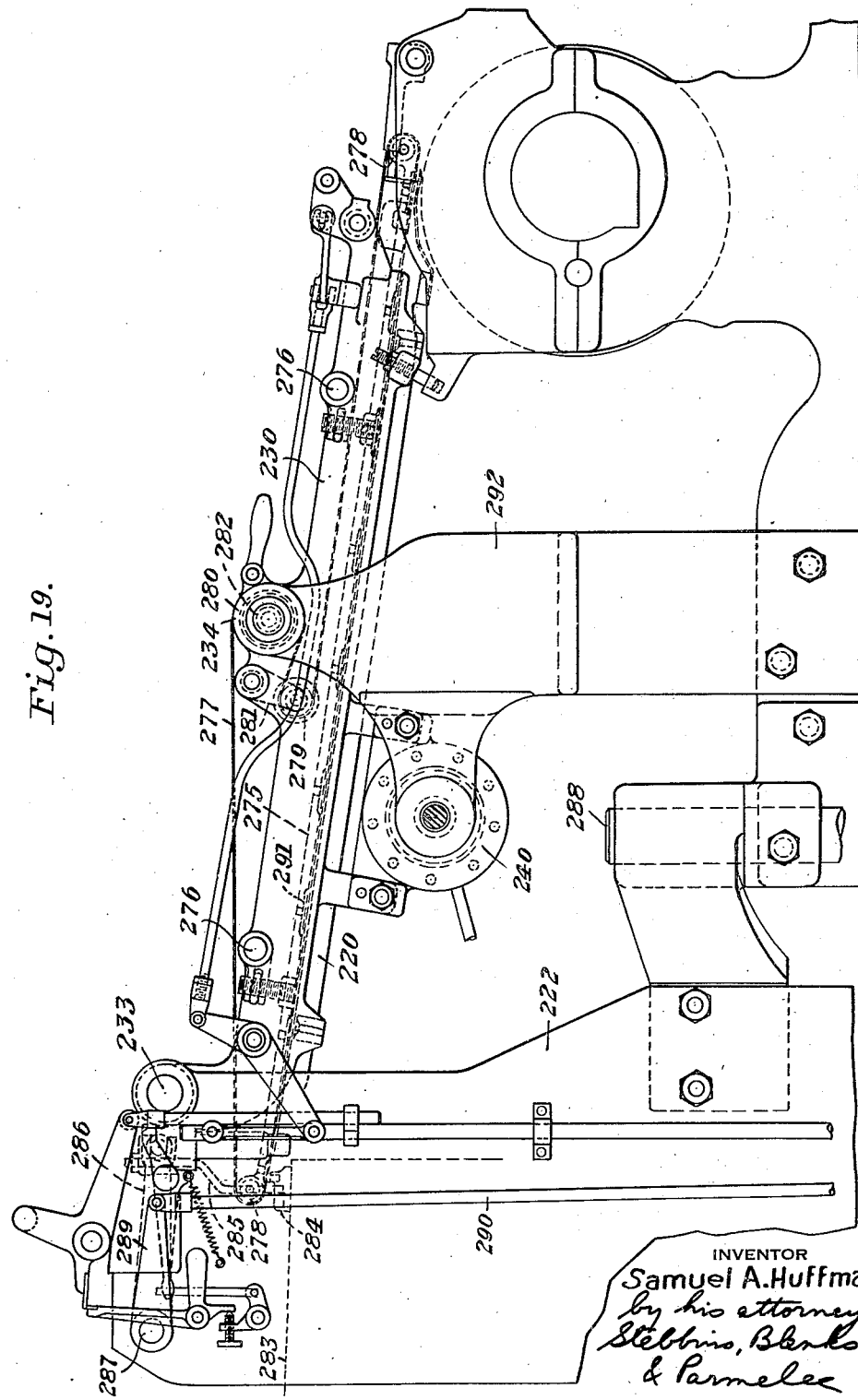
Figure 20:
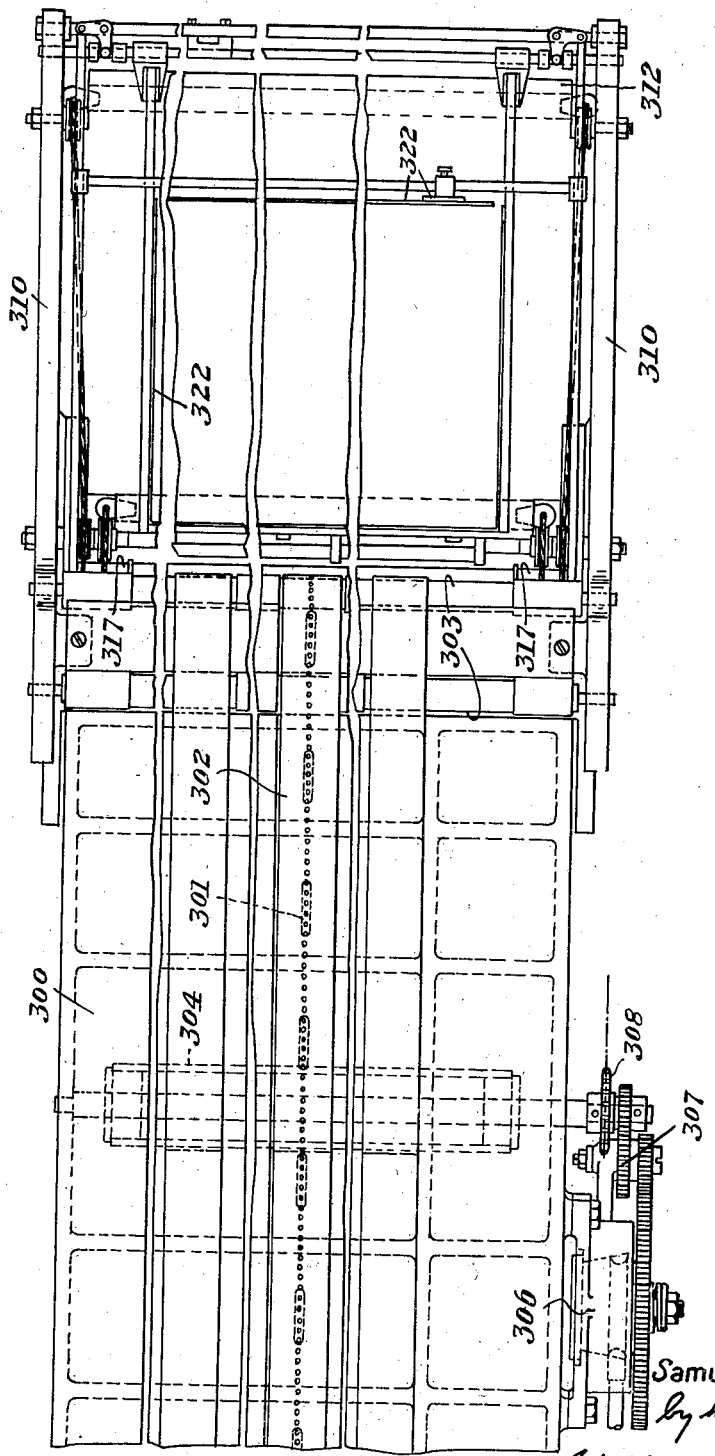
Figure 21:
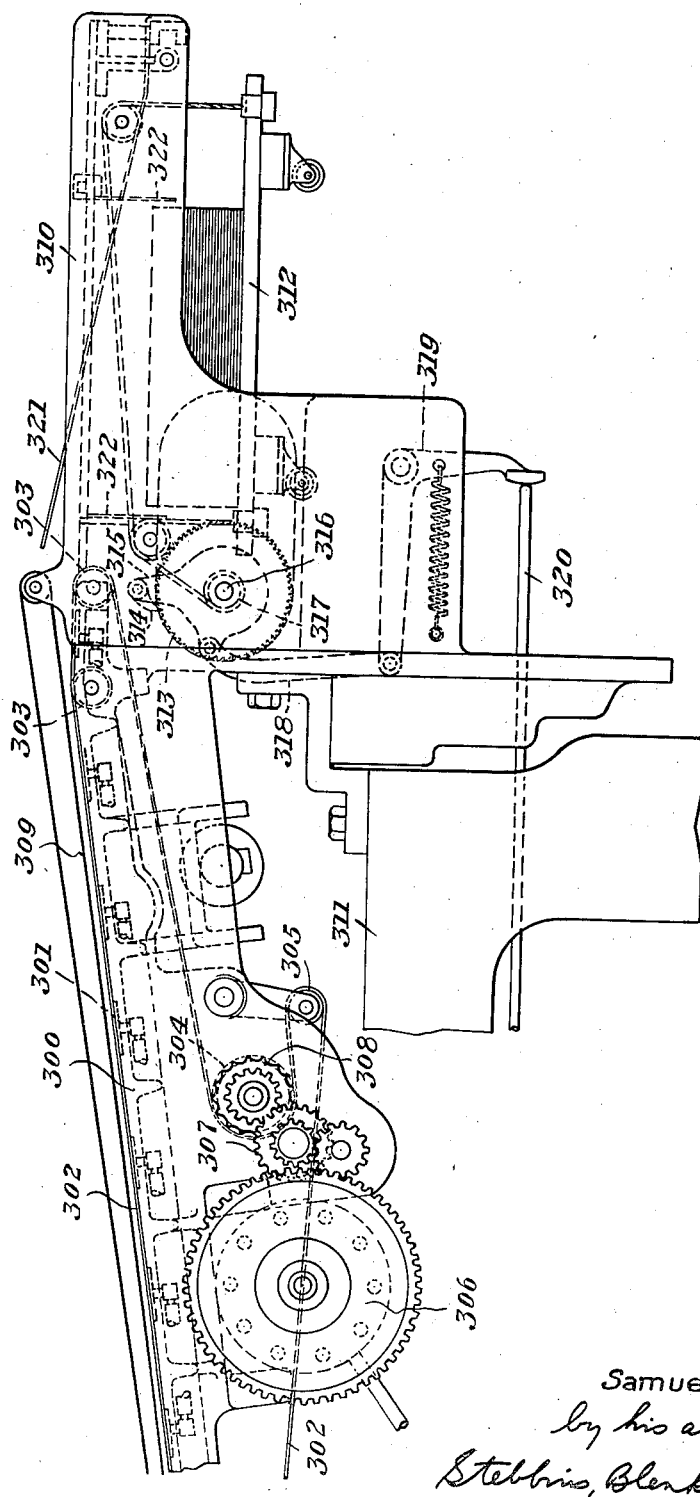
Figure 22:
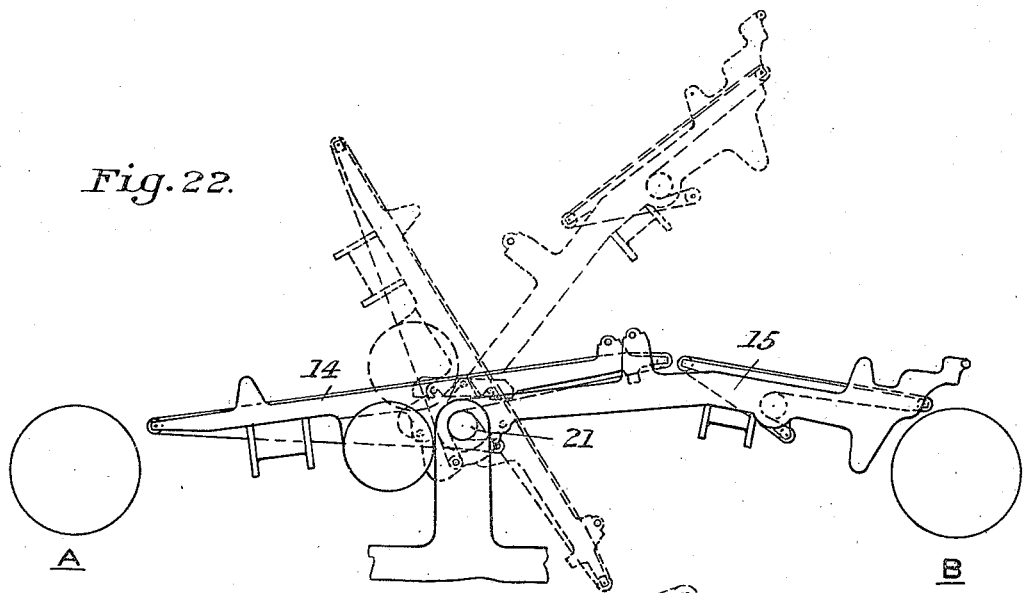
Figure 23:
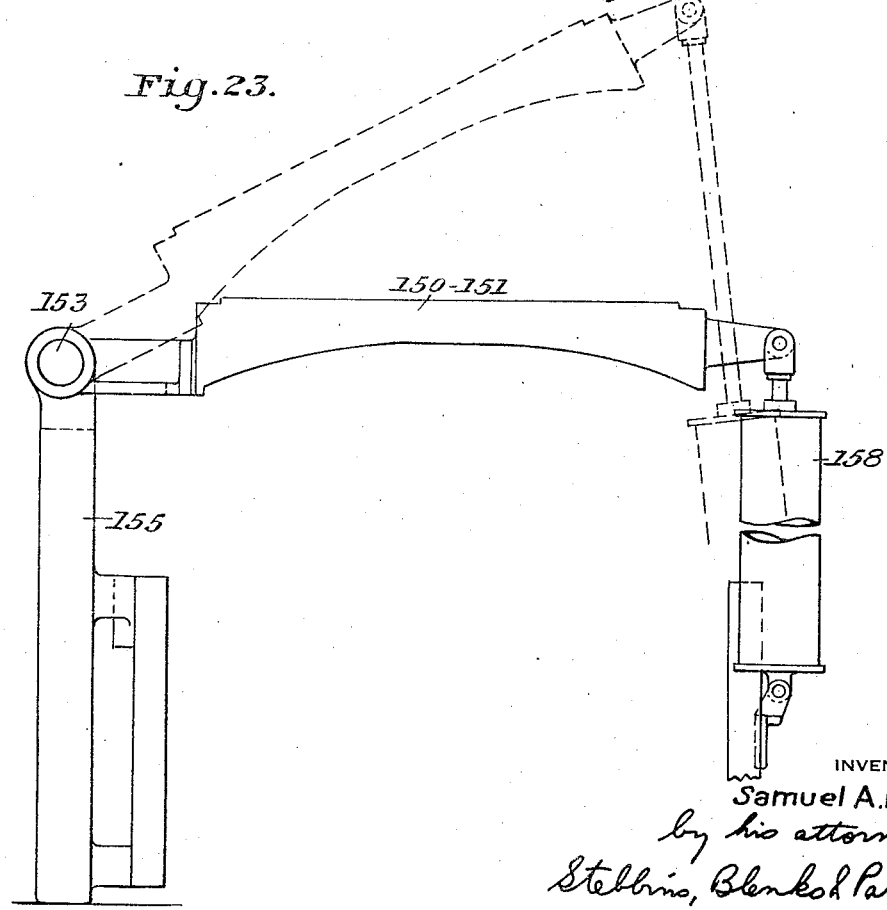
Figure 24:
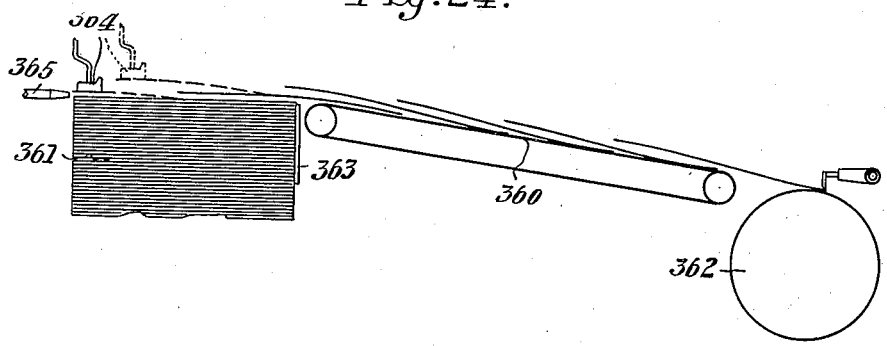
Figure 25:
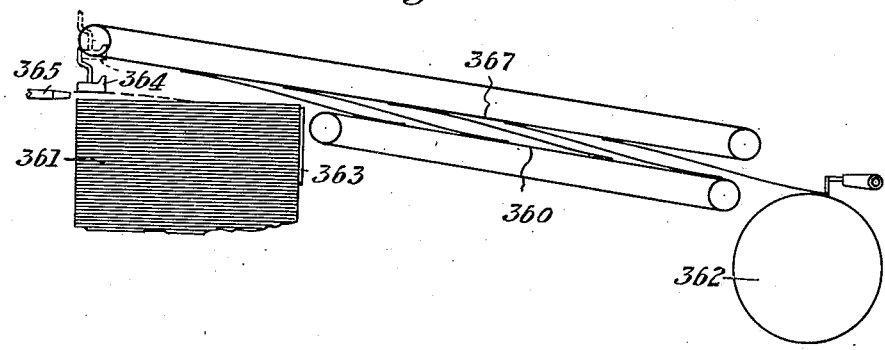
Figure 26:
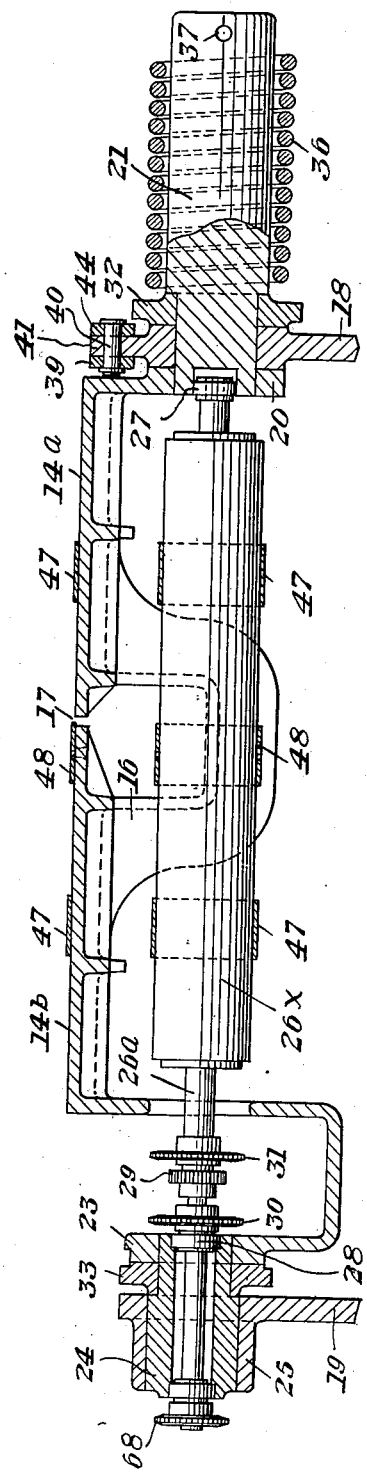
Figure 27:
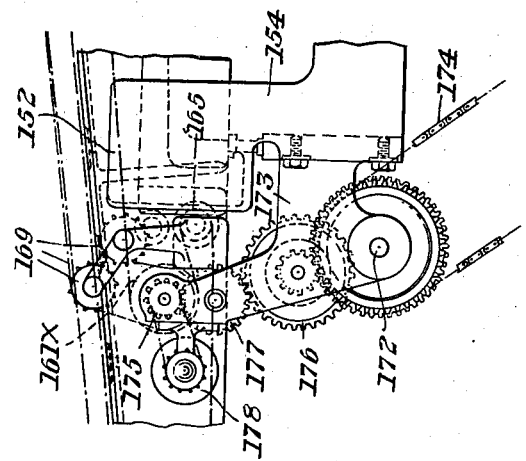

Figs. 14A and 14B together constitute a side elevation of the modified transfer conveyor mechanism;

Fig. 15 is a plan view of a conveyor mechanism for feeding sheets singly from a stock pile to the cylinder of a press of the flat bed and cylinder type;

Fig. 16 is a side elevation thereof;

Fig. 17 is a view partly in section and partly in elevation to an enlarged scale illustrating certain of the details shown in Figs. 15 and 16;

Fig. 18 is a plan view of a modified form conveyor for feeding sheets from a pile to a press cylinder;

Fig. 19 is a side elevation thereof;

Fig. 20 is a plan view of a conveyor mechanism adapted to receive sheets after passing through a press and deliver them to a suitable pile support;

Fig. 21 is a side elevation thereof;

Figs. 22 and 23 are diagrammatic views illustrating the tilting movement of which the transfer conveyors shown in Figs. 1A to 14B are capable;

Fig. 24 is a diagrammatic view of a further form of sheet feeder;

Fig. 25 is a similar view of a still further form of feeder;

Fig. 26 is a view identical with Fig. 6 except that it shows a driving sheave of increased diameter; and Fig. 27 is a fragmentary view identical with the upper left-hand corner of Fig. 14B except that it shows a driving sheave of increased diameter.

The following detailed description will be divided into several sections, referring to the various forms of the invention indicated by appropriate sub-titles.

CONVEYOR FOR TANDEM PRESSES—CENTER HINGE TYPE
(Figs. 1A through 10)

This form of the invention is intended to receive sheets after they have passed through a press A and deliver them to a press B arranged in tandem therewith, for a second printing operation. The presses A and B may be of any desired type but are illustrated herein diagrammatically as of the flat bed and cylinder type. The side frames of the press A are indicated at 10 and 11 and those of the press B at 12 and 13. The conveyor mechanism of my invention extends between the cylinders of the presses and comprises generally a delivery board 14 and a feed board 15. The boards 14 and 15 are castings provided with spaced ribs for rigidity and are formed in two sections connected by yokes 16 as best shown in Fig. 6. The portions of the delivery board on opposite sides of the central division slot 17 are indicated by numerals 14a and 14b.

The delivery board 14 is supported on bearing brackets 18 and 19 secured to the side frames 10 and 11 of the press A. The portion 14a of the delivery board has a bearing lug 20 journaled on a stub shaft 21 keyed to the bracket 18 (see Fig. 6). The inner end of the shaft 21 provides a journal on which the lug 20 is rotatably disposed.

The portion 14b of the delivery board has a bracket 22 formed integral therewith terminating in a lug 23. The lug 23 is rotatably disposed on the inner end of a sleeve 24 seated in a socket 25 at the upper end of the bearing bracket 19.

A driving sheave 26 is carried on a shaft 26a which is journaled in bearings 27 and 28 seated in the inner ends of the stub shaft 21 and the sleeve 24. The shaft 26a is provided with a pinion 29 and sprocket wheels 30 and 31. The sheave 26 drives conveyor belts travelling along the board 14 which will be referred to in greater detail shortly.

Side arms 32 and 33 are rotatable on the inner ends of shaft 21 and sleeve 24, and extend substantially horizontally therefrom toward the press B. Projections extending inwardly from the side arms provide a support for the board 15 which is secured thereto by screws 35. By virtue of the construction described the board 14 is tiltable clockwise and the board 15 counter-clockwise about the common axis of the shaft 21 and sleeve 24, to the positions shown in dotted lines in Fig. 22. It will be evident that this construction provides clear access to the mechanisms of the presses A and B for the purposes of makeready, inspection and adjustment. A coil spring 36 disposed about the outer end of shaft 21 normally exerts a torsional force tending to raise the board 15 to the position shown in dotted lines in Fig. 22. The spring thus counter-balances the weight of the board 15 and facilitates elevation thereof. As shown in Fig. 9, one end of the spring engages a pin 37 adjacent the outer end of the shaft 21 while the other end of the spring engages a pin 38 threaded into the side arm 32. A latch bar 39 pivoted on a pin 40 traversing a projection 41 extending upwardly from the bearing bracket 18 has a notch 42 adapted to engage a pin 43 extending laterally from the flange of the board 14 to hold the latter in up-raised position. A latch bar 44 similarly mounted has a notch 45 adapted to receive a pin 46 extending from the side arm 32 to hold the board 15 in uplifted position. The latch bars can easily be released manually when it is desired to lower the delivery and feed boards to normal position. Suitable abutments are provided on the presses A and B for receiving the ends of the boards 14 and 15 when in normal position.

The board 14 is provided with a plurality of conveyor belts 47 adjacent the edges thereof and a central belt 48. The belts 47 are supporting belts and belt 48 is a traction belt, being provided with perforations 49 adapted to line-up with vacuum ports 50 formed at intervals along the length of the board. The belts 47 and 48 are trained over guide sheaves 51 and 52 at opposite ends of the board, a guide sheave 53 adjacent the sheave 52, the driving sheave 26 and a belt tightening sheave 54. The latter is journaled on pivoted arms 55 which may be provided with suitable tension springs to maintain the desired degree of tautness in the belts 47 and 48. Hold-down belts or tapes 56 are trained over sheaves 57 and 58 adjacent opposite ends of the board 14 and over guide and tightening sheaves 59 and 60. These tapes do not normally engage the sheet but serve merely to prevent the front corners thereof from floating up. The sheave 59 is journaled in bearings carried by plates 61 secured to the sides of the board 14. The sheaves 57 and 59 are journaled in bearing arms 62 carried on a cross-bar 63. The ends of the bar 63 are seated in ears 64 extending upwardly from the sides of the board 14. The sheave 60 is carried in bearings 65. The bearings 65 are mounted on rods 66 extending through eyes in projections 67 on the arms 62. Springs and thumb-nuts on the rod 66 permit adjustment of the tape tension.

The shaft 26a is chain driven through a sprocket 68. The chain drive for the shaft includes a sprocket (not shown) driven from the main drive of the press A. By means of the chain drive the belts 47 and 48 move at a speed proportional to the peripheral speed of the cylinder of the press A. The actual speed of the belts may be made equal to or slightly greater than the peripheral speed of the cylinder. In the structure shown in Figures 1 to 12, inclusive, the speed of the belts 47 and 48 is equal to the peripheral speed of the cylinder A. In Figure 26 there is shown a modified structure including a driving sheave 26X somewhat larger in diameter than the sheave 26 and which drives the belts at a speed slightly greater than the peripheral speed of the cylinder The tapes 56 are driven by a chain and sprocket drive from the shaft 26a, the drive including the sprocket 31 on said shaft, and a sprocket 69 on the shaft on which the sheave 58 is mounted. The chain forming part of this drive also engages a sprocket 70 connected to a centrifugal gas valve 71 controlling the supply of fuel to burners disposed adjacent the tapes 56 for discharging static from the sheets. These burners are located in a trough 72 formed in the board 14. The sheets and top tapes run through the flame at a speed sufficient to prevent scorching. The valve 71 cuts off the gas when the tape drive is stopped.

In order to cause the belt 48 to advance a sheet delivered onto the board 14 from the cylinder of the press A, I provide means for applying vacuum progressively to the ports 50. Because of the perforations 49 in the belt 48 the vacuum applied to the ports 50 causes a sheet delivered to the board 14 to be held against the belt 48 by atmospheric pressure. I provide a rotary valve for controlling the application of vacuum to the ports 50 in a manner such that the point at which vacuum is applied at any instant will coincide substantially with the position of the leading edge of a sheet moving along the board, at that instant. The valve is shown in Figs. 3 through 5 and is indicated generally in Figs. 1A and 2A by the numeral 73. The valve comprises a stator 74 and a rotor 75. The stator has feet 76 whereby it is secured to pads formed on the side of the board 14. The stator has a tapered bore and the rotor is correspondingly shaped for cooperation therewith. Ports 77 are spaced circumferentially of the bore through the stator. Hose connections 78 extend between fittings screwed into tapped holes in the stator 74 and board 14, communicating respectively with the ports 77 and the ports 50. A main vacuum port 79 formed in the stator 74 is similarly connected to a vacuum pump (not shown).

An annular groove 80 is formed in the rotor 75 and is so positioned axially thereof as to overlie the port 79. A recess 81 formed in the rotor communicates with the groove 80 and is adapted successively to overlie the ports 77 on rotation of the rotor. By this means, the ports 50 are successively connected to the vacuum pump as the recess 81 passes over the ports 77 to which the ports 50 are connected. As shown in Fig. 5, the recess 81 is wide enough to overlie two adjacent ports 77 simultaneously. This insures that at least one of the ports 50 will have vacuum applied thereto at all times or, in other words, that before vacuum is cut off from one port, it will be applied to the next succeeding port. Continuous traction of the belt 48 on the advancing sheet is thus assured.

The rotor 75 is keyed to a shaft 82 having a flange 83 engaging a bearing surface 84 on the stator 74. The rotor 75 has a flange 85 on which gear teeth are formed as at 86 providing a driving gear for the rotor. The rotor 75 is held on the shaft 82 by a spring 87 and nut 88.

The pinion 29 on the shaft 26a meshes with a gear 89 journaled on a bearing bracket 90 formed integral with the stator 74. A pinion 91 formed on a sleeve integral therewith and with the gear 89, meshes with a pinion 92 also mounted on the bracket 90. The pinion 92 meshes with the gear 86 formed on the rotor 75.

The feed board 15 is similar in general to the delivery board 14. It is provided with a single traction belt 93 disposed in alinement with the belt 48 having perforations 94. Ports 95 formed in the feed board have vacuum applied thereto through hose connections 96 extending to the valve 73. The vacuum applied to the last port 95 in the board 15 is not controlled by the valve 73 but by a relief valve shown in Figs. 11 and 12 which will be described in detail shortly.

The belt 93 is trained over idler pulleys 97 journaled at opposite ends of the feed board. The belt is also trained over a driving sheave 98 mounted on a shaft 99 journaled in the side arms 32 and 33. The belt also traverses a tightener pulley 100 similar to that shown at 54.

A shaft 101 journaled in a bearing sleeve formed on an arm 102 extending from the side frame 13 of press B has a pulley 103 thereon. Cooperating clutch members 104 on the shafts 99 and 101 are normally engaged by a spring 105. A clutch release bar 106' is slidably mounted on the side arms 32 and 33 and has operating handles at each end thereof.

Figure 1A:
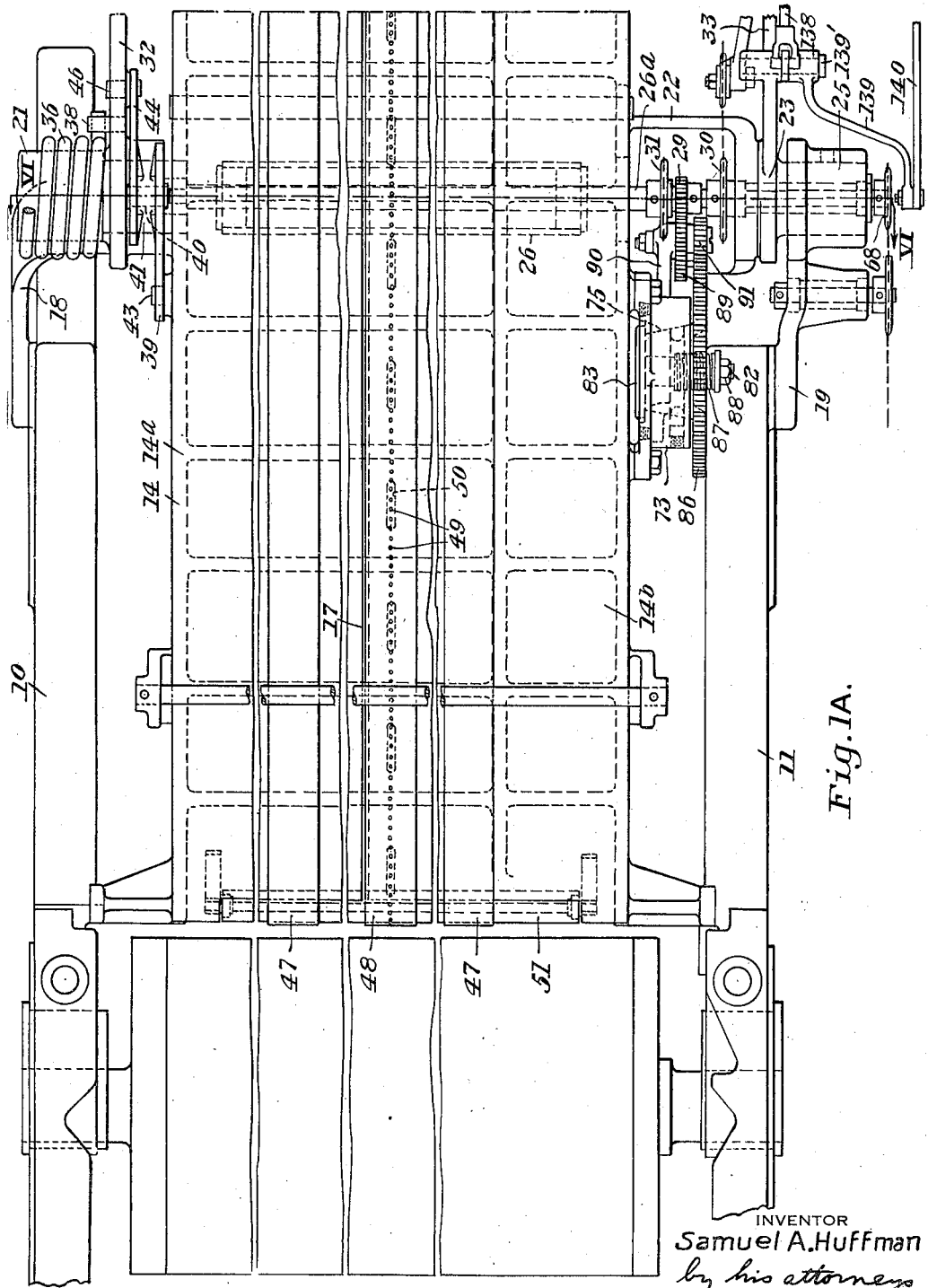
Figure 13:
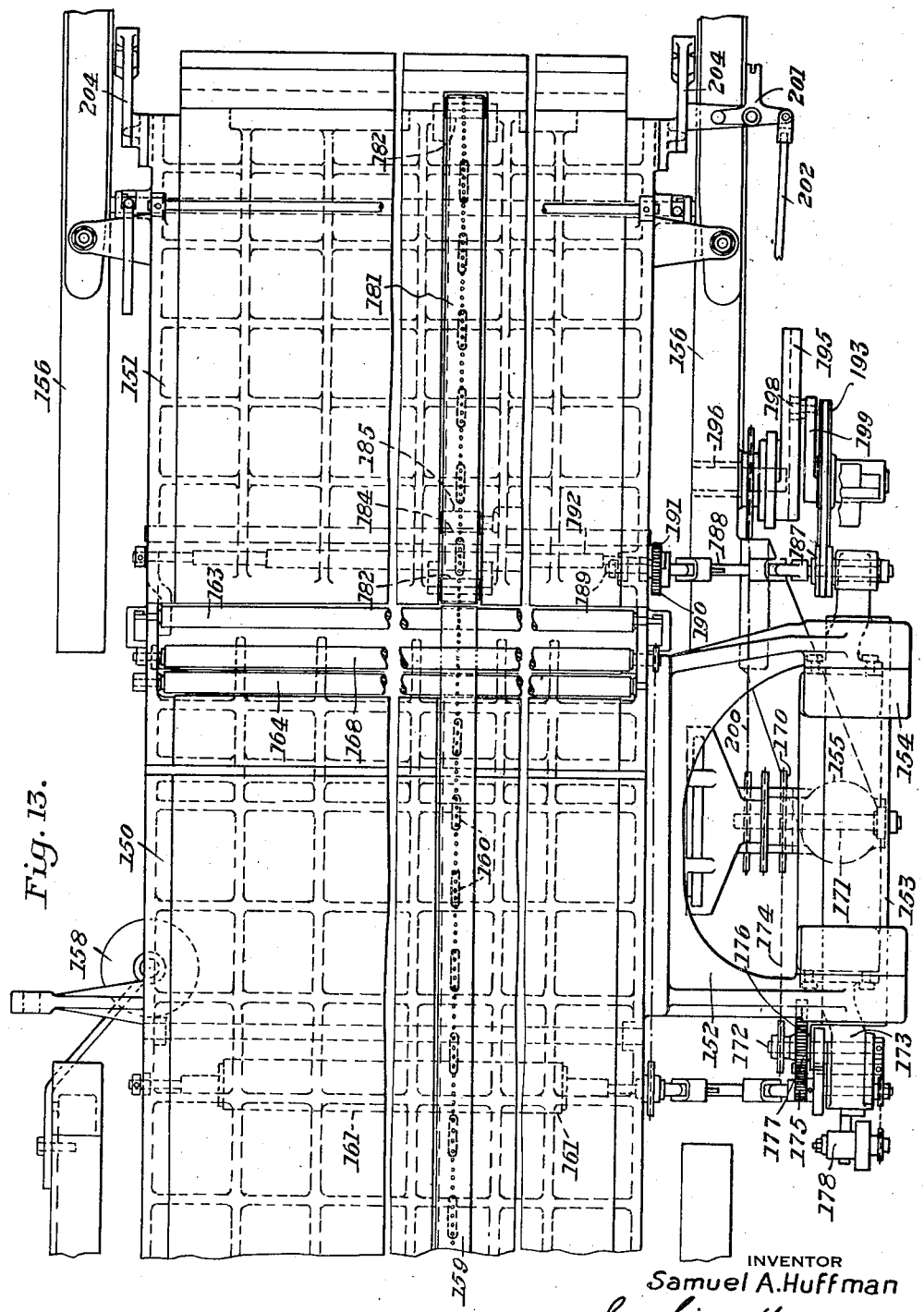
Fig. 13 is a plan view of a modified form of conveyor mechanism for receiving sheets successively from the press and transferring them to a second press arranged in tandem therewith.

The pulley 103 is driven at a variable speed by means which are shown in detail in Figs. 13 and 14B. This means will be described with the other structure shown in these figures, but is omitted from Figs. 1B and 2B to avoid duplication and repetition. For the present it is sufficient to state that the shaft 101 is so driven that the belt 93 is travelling at about the same speed as the belt 48 when the leading edge of a sheet leaves the latter and engages the former. The belt 93 is first accelerated, then decelerated gradually until it is travelling at a very low speed by the time the leading edge approaches the drop guides of the press B shown at 106. The progressive release of the vacuum effected by the valve shown in Figs. 11 and 12 permits the sheet to be stopped in engagement with the drop guides 106. Side register means (not shown) then becomes operative, thus accurately positioning the sheet for engagement by the grippers of the cylinder of press B. The belt 93 continues to move at slow speed, thus urging the sheet against the drop guides during side registering. Vacuum is applied progressively to the ports 95 (except the last one) through the hose connections 96 by the valve 73 in the manner already described.

Hold down tapes 93a similar to those shown at 56 are trained about a sheave 94a and guide and tightening sheaves 95a carried on the frames 32 and 33. These tapes are driven from shaft 26a through a chain trained about sprocket 30 and a sprocket 96a on the shaft on which sheave 94a is mounted.

The application of vacuum to the last suction port 95 on the board 15 (that closest to the drop guides 106) is controlled by a valve shown in Figs. 11 and 12 including a cylinder 107 and a piston 108. The cylinder is mounted on the bracket 107a pivoted at 107b to a fixed standard 107c. An adjusting screw 107d threaded through a projection 107e permits the valve cylinder to be adjusted about the center of the pivot 107b.

The cylinder 107 has a port 109 connected to a convenient source of vacuum which may be the same pump which supplies suction to the other port 95. A port 110 is connected by suitable fittings and hose to the port 95 nearest the drop guides 106. A port 111 communicates with the atmosphere.

The piston 108 is normally maintained in its lowermost position by a spring 108a. A bell crank 112 pivoted on the standard 107c at 112a has a fork 112b cooperating with a pin 112c extending through an eye bolt 112d threaded into the piston 108. The spring 108a is secured to the pin 112c and a pin 108b threaded in the cylinder.

The crank 112 is adapted to be operated by a cam 113 driven in the direction indicated by the arrow, in timed relation to the operation of the cylinder of press B. The cam cooperates with a roller 112e on the bell crank 112 and has a portion 113a of maximum radius, a portion 113b of minimum radius and a portion 113c of intermediate radius. The cam may be driven by any convenient means and may be located adjacent its drive. The location of the standard 107c and valve 107 is determined by the location of the cam.

The roller 112e is shown in engagement with the minimum radius portion 113b of the cam and the piston 108 is shown in its lowermost position corresponding thereto. In this position, the port 110 is in communication with the atmosphere through the port 111. When the roller 112e engages the portion 113a, the piston 108 is raised to its uppermost position wherein the port 110 communicates directly with the port 109. When the roller 112e engages the portion 113c of the cam, the valve piston 108 occupies an intermediate position in which the port 110 communicates with both the port 109 and the port 111.

The operation of the cam 113 is so timed relative to the operation of the press B that the roller 112e is engaged by the portion 113a about the time the leading edge of a sheet leaves the next to the last suction port 95. Full vacuum is thus supplied to the last port 95 for a relatively short time only. When the portion 113c of the cam engages the roller 112e, the vacuum applied to the last port 95 is reduced since the port 110 communicates with the port 111 as well as the port 109 when the piston 108 is in intermediate position. The reduction in the vacuum permits the traction belt 93 to slip under the sheet as the latter approaches and engages drop guides 106. Thus the sheet is effectively registered to the drop guides. Side registry of the sheet is also effected during the period of application of reduced vacuum. Owing to the reduced vacuum on the sheet the sheet is sufficiently free for ready registry both with the drop guides and with the side guides. While the sheet is still subjected to the reduced vacuum the grippers of the cylinder of the press B seize it. Finally the portion 113b of the cam 113 engages the roller 112e whereupon the valve piston drops to the illustrated position cutting off the vacuum entirely. This occurs after the grippers have seized the sheet. As before stated, the continued advance of the traction belt during the period of partial vacuum operation urges the sheet against the drop guides while side registry is effected. This prevents misalinement which might otherwise occur by movement of the front edge away from the drop guides during side registry.

The mechanism for operating the side registering means includes an axially reciprocable shaft 135 supported in lateral extensions 136 of the side arms 32 and 33. A bell crank 137 pivoted on the extension 136 of the side arm 33 has a pin and slot connection with the shaft 135. A link 138 is pivoted to one arm of the bell crank 137 and to one arm of a bell crank 139 carried on a pin 139' extending through the side arm 33 near the shaft 26a. The other end of the bell crank 139 is pivoted to a link 140 reciprocated by any convenient means such as a cam, crank or the like, in timed relation with the operation of press B. Any convenient form of side registering means may be actuated by the shaft 135.

It will be clear from the foregoing description that the invention provides conveying means for receiving a sheet from a press after it has been printed therein and delivering it accurately registered to the cylinder of a second press. As already stated, the speed of the delivery board conveyor belts may be substantially the same as or greater than the peripheral speed of the cylinder of press A. The sheet is held in contact with the traction belt 48 as it travels along the delivery board. Since the traction belt engages the backs of the sheets, it cannot cause any smearing of wet ink on the front thereof. The hold-down tapes prevent the edges of the sheet from being lifted by the resistance of the air. The speed of the hold-down tapes is substantially the same as that of the traction belt. The tapes and belts deliver the sheet at constant speed to the conveyor belt on the feed board. The speed of this belt is variable, its initial speed being equal to or slightly greater than the speed of the delivery board conveyor. The feed board conveyor belt is so driven as to accelerate the sheet slightly and then decelerate it almost to a stand still as it approaches the drop guides. The conveyor does not actually stop but continues to urge this sheet against the drop guides while side registry takes place. After accurate registry the grippers on the cylinder of the second press engage the leading edge of the sheet for the second printing operation.

The rotary valve maintains the application of vacuum to the conveyor belts at the point where the leading edge of the sheet engages the latter, to insure positive feeding without slippage. As the leading edge of the sheet passes from the delivery board to the feed board, the portion of the sheet rearwardly of the leading edge is free for acceleration or deceleration by the feed board belt. Similarly, when the sheet approaches registering position the vacuum is released to permit slippage of the belt thereunder thus preventing crumpling.

Since the delivery board has only a single conveyor belt the sheet will be alined by the drop guides should its leading edge not be precisely perpendicular to the path of travel. The tiltable mounting of the boards 14 and 15 is a great convenience. Disengagement of clutch 104 is the only preliminary operation necessary.

CONVEYOR FOR TANDEM PRESSES—SIDE HINGE TYPE

This form of the invention shown in Figs. 11 through 14b is similar in general to that already described, the principal difference being in the manner of mounting the delivery and feed boards for tilting movement.

The side hinge conveyor mechanism comprises a delivery board 150 and a feed board 151. A hinge bearing 152 is secured to the board 150 and pivots on a hinge pin 153 carried in a yoke 154 or cooperating hinge member mounted on a post 155. The post 155 is carried on the side frame 156 of the second press. The boards 150 and 151 may be tilted to inclined position indicated diagrammatically in Fig. 23 by a fluid pressure cylinder and piston 158.

The board 150 is provided with a traction belt 159 similar to the belt 48 of the center hinge conveyor mechanism. Perforations in the belt cooperate with ports 160 in the board in the manner previously described. The belt 159 is trained about a driving sheave 161 carried on a shaft journaled in the side flanges of the board 150. The belt also traverses idler sheaves 162 and 163 journaled in opposite ends of the board as well as a guide sheave 164 and a tightener 165. Hold-down tapes 166 cooperate with the belt 159. These tapes are trained about guide and tightening sheaves 167 similar to those shown in Fig. 2A and about a driving sheave 168 journaled in the opposite end of the board 150. The sheave 168 is driven from the shaft on which the sheave 161 is mounted through a chain and sprocket drive 169.

The sheave 161 is driven from a main driving sprocket 170 journaled on a shaft 171 extended inwardly from the post 155 and rotatable therein. A shaft 172 journaled in a bracket 173 carried on the hinge member 154 is driven from the shaft 171 through a chain and sprocket drive 174. A pinion 175 on the shaft carrying the sheave 161 is driven from the shaft 172 through gear and pinion drives 176 and 177, the gears and pinions of which are rotatably mounted on the bracket 173. A centrifugal gas valve 178 is driven from the shaft carrying sheave 161 through a chain and sprocket drive.

The progressive application of vacuum to the ports 160 is controlled by a rotary valve 179 driven from the shaft 171 by a chain and sprocket drive 180. The valve 179 is similar in structure and function to the valve 73.

The feed board 151 is provided with a traction belt 181 trained about guide sheaves 182 at opposite ends of the board about a belt tightener sheave 183, a driving sheave 184 and a guiding sheave 185. The sheaves 182, 184 and 185 are journaled in suitable bearings in the board while the sheave 183 is journaled on pivoted arms 186. The sheave 184 is driven by pulley 187. The pulley is coupled by a shaft 188 including universal joints to a shaft 189 having a gear 190 thereon. The gear 190 meshes with the gear 191 on a shaft 192 on which the sheave 184 is mounted.

A variable speed drive for the belt 181 comprises a pulley 193 journaled on a bearing bracket 194 dependent from the side frame 156. A crank 195 is journaled on a shaft 196 extending laterally from the side frame 156 and has a slide 197 thereon and which reciprocates a block 198. A crank 199 carried by the pulley 193 has a pivotal connection with the block 198. The crank 195 is driven from the shaft 171 by a chain and sprocket drive 200.

It will be apparent that the elements just described cause the pulley 193 to move at maximum angular velocity when the throw of the crank 195 is a maximum, i. e., when the crank extends substantially upward. Similarly, the pulley 193 moves at its minimum angular velocity when the crank 195 extends downwardly. The variation in the speed of the pulley 193 is caused by the eccentricity between its axis and that of the crank 195.

The belt 181 is thus driven at variable speed and the parts of the drive mechanism are so dimensioned and arranged that the belt travels at its minimum speed when the vacuum is applied to the port nearest the cylinder of the second press. A similar drive is provided for the belt 93 of the center hinge conveyor of Figs. 1–12 but is not illustrated.

The side hinge conveyor is provided with side registering mechanism including a bell crank 201, a link 202 and bell crank 203. The bell crank 201 operates in the same manner as the bell crank 137 to shift an axially slidable rod carried in lateral projections 204 extending from the side flanges of the board 151. A link 205 is pivoted to the bell crank 203 and is actuated by any suitable reciprocating mechanism, in accordance with the rotation of the press cylinder, the timing being such that side registry is effected just before the cylinder grippers seize the sheet.

Hold-down tapes 206 cooperate with the belt 181, being trained around the sheave 168 and guide and tightening sheaves 207.

The operation of the side hinge conveyor shown in Figs. 13 through 14B is much the same as that of the center hinge conveyor previously described. Sheets delivered from the cylinder of the first of two presses arranged in tandem indicated at A' are received by the traction belt 159 of the delivery board 150. The rotary valve 179 causes vacuum to be applied successively to the ports 160 whereby the leading edge of the sheet is held against the belt 159 at all times and moves therewith. The hold-down tapes 166 prevent curling up of the end or corners of the sheet.

As in the case of the center hinge conveyor, the belt 159 may be driven at a speed which is the same as the peripheral speed of cylinders of press A' or at a slightly greater speed. In the structure shown in Figures 14A and 14B the speed of the belt 159 is equal to the peripheral speed of the cylinder A'. In Figure 27 there is shown a modified structure including a driving sheave 161X somewhat larger in diameter than the sheave 161 and which drives the belt at a speed slightly greater than the peripheral speed of the cylinder. In either case the belt 159 is driven at substantially constant speed. As the sheet leaves the delivery board 150, it passes directly onto the feed board 151 and thereafter moves under the influence of the belt 181. The variable speed drive for this belt is so designed and adjusted that the belt is travelling at the same speed as the belt 159 when the leading edge of the sheet engages the belt 181. Thereafter the belt 181 is slightly accelerated and then decelerated as the sheet approaches the cylinder of the second of the two tandem presses indicated at B'. At that instant the belt 181 is travelling very slowly, and the vacuum applied to the port 160 of the feed board nearest the cylinder is almost entirely relieved so that side registry can be effected. During side registry, the slow movement of the belt 181 keeps the leading edge of the sheet against the drop guides of the press B' (not shown). The sheet is thus accurately positioned for printing in the press B' when the drop guides thereof are raised and the sheet engaged by the cylinder grippers.

The side hinge comprising the members 152 and 153 and 154 permit the delivery board and feed board to be tilted as indicated in Fig. 23 to permit access to cylinders and inking mechanism of the presses A' and B'. Such tilting is permitted by the universal joints in the drive shafts extending laterally from the feed and delivery boards.

VACUUM BELT FEEDER

Figs. 15 through 17 illustrate the application of the vacuum belt conveyor to the feeding of sheets successively from a pile. The illustrated embodiment of the invention is designed for feeding sheets to the cylinder of a press C but it may be employed with equal facility for feeding sheets to other processing machines. The feeder conveyor shown in Figs. 15 through 17 comprises a feed board 220 having vacuum ports 221 spaced therealong. The feed board extends from frame members 222 on which a pile support 223 is mounted for vertical movement, to a point adjacent the cylinder of the press C, being secured to the side frames thereof as at 224.

A perforated belt 225 is trained over guide sheaves 226 journaled in the feed board, a driving sheave 227 mounted on a shaft 228 and a belt tightener 229. The shaft 228 is journaled in side arms 230 and 231 to which the feed board 220 is secured. The tightener sheave 229 is mounted on links 232 pivoted to the side flanges of the feed board. The side arms 230 and 231 are pivoted on a shaft 233 extending between frame members 222, and the whole conveyor mechanism may be tilted about the shaft.

The shaft 228 is driven by a pulley 234 through a clutch 235. The pulley 234 is carried on a shaft 236 journaled in a bearing bracket 237. Cooperating clutch members on the shafts 228 and 236 are normally urged into engagement by a spring 238. A clutch releasing bar 239 is slidably mounted in the side arms 230 and 231.

The pulley 234 is driven at a variable speed by mechanism like that shown in Figs. 13 and 14B, including the pulley 193 and the crank 195. By this means, a sheet advanced by the belt 225 is decelerated almost to a standstill on approaching the drop guides of the press.

A rotary valve 240 controls the application of vacuum progressively to the ports 220 in the manner which has already been described. The valve is driven by a chain and sprocket drive through a clutch 241 normally maintained in engagement by a spring 242. A releasing bar 243 for the clutch 241 is slidably mounted in the side arms 230 and 231. Hold-down tapes 244 are trained about guide and tightening sheaves 245 and a driving sheave 246. The latter is driven by a belt 247 trained about a pulley 248 on the shaft 228 and a pulley 249 on the shaft on which sheave 246 is mounted.

Sheets are fed successively from a pile indicated at 250 by suction feet 251. The feet 251 are carried on supporting rods 252 depending from arms 253. The arms 253 are pivoted to cranks 254 secured to a cross shaft 255. This shaft is oscillated by a push rod 256 and a crank 257. The push rod may be reciprocated by any convenient means in timed relation with the operation of the press.

The arms 253 have pins 258 at their rear ends fitting into arcuate slots 259 in guide plates 260. The plates 260 are secured to a cross bar 261 and are journaled on the shaft 255. By reason of this construction, it will be apparent that the shoes 251 move from the position shown in solid lines in Fig. 17 to the position shown in dotted lines and vice versa, on oscillation of the shaft 255. Vacuum is applied to the feet 251 by suitable hose connections (not shown). The pile support 223 is raised automatically to maintain the top sheet at an elevation such that it will be engaged by the shoes 251. The shoes are thus effective to engage the leading edge of the top sheet on the pile and advance the sheet to a position such that its leading edge is subject to the vacuum applied to the first port 221 on the feed board. The degree of vacuum applied to the shoes and the port can be so controlled that when the sheet has been caused to engage the belt, it readily departs from the shoes. After the sheet has been engaged by the belt, it is advanced along the feed board in the manner already described.

The feeder conveyor is provided with side registry means including a shaft 262 reciprocable axially in lateral extensions 263 from the side arms 230 and 231. A bell crank 264 pivoted on the side arm 230 has a pin and slot connection with the shaft 262. A link 265 connects the bell crank 264 with a bell crank 266 pivoted on the side arm 230. A push rod 267 reciprocated by any convenient means in timed relation with the operation of the press is connected to the bell crank 266 by a link 268.

It will be seen from the foregoing description that the invention may be embodied in a conveyor for feeding sheets from a pile to a machine such as a printing press wherein they are individually processed. As each sheet is engaged by the traction belt, it is accelerated for rapid feeding movement and then decelerated almost to a standstill for front and side registry.

VACUUM BELT FEEDER CONVEYOR INVERTED BELT

Figs. 18 and 19 show a modification of the structures 15 through 17 in which the traction belt is disposed above the feed board. This is desirable for feeding certain types of sheets such as cardboard. The structure of Figs. 18 and 19 is quite similar to that of Figs. 15 through 17, and corresponding parts will be designated by the same reference numerals, the principal difference being that the former is provided with a vacuum plate 275 disposed above the feed board 220 and supported on cross bars 276 carried in the side arms 230 and 231. A traction belt 277 is trained over guide sheaves 278 at the ends of the plate 275 and around tightener and driving sheaves 279 and 280. The tightener sheave 279 is journaled on arms 281 pivoted to the side arms 230 and 231. The sheave 280 is mounted on a shaft 282 corresponding to the shaft 228 of Fig. 15. Hold-down tapes (not shown) may be provided as in the forms of the invention already described. Since the conveyor belt is mounted above the feed board in the structure shown in Figs. 18 and 19, it is unnecessary to provide any hold-down tapes.

Sheets are fed to the belt 277 from a pile 283 by suction feet 284. The latter are carried on supporting rods 285 depending from cranks 286 keyed to a cross shaft 287. The latter is journaled in the frame members 222. Fig. 19 shows how the frame members 222 are hinged to the press frame at 288.

The shaft 287 is oscillated by a crank 289 to which a push rod 290 is pivoted. The push rod 290 is reciprocated by any convenient means. It will be evident that reciprocation of the push rod causes vertical reciprocation of the feet 284. The latter are effective to lift the top sheet from the pile 283 into engagement with the belt 277. The vacuum applied to the ports 291 formed in the plate 275 by the valve 240 causes the sheet to be seized by the belt 277 and fed down the board 220.

The operation of the feeder conveyor shown in Figs. 18 and 19 is substantially the same as that of the conveyor of Figs. 15 through 17. It will be understood that the traction belt 277 is driven at a variable speed in the same manner as the belt 225. The driving shaft 236 of the modification shown in Figs. 18 and 19 is journaled in a bearing standard 292 which also carries the drive shaft for the valve 240.

VACUUM BELT DELIVERY CONVEYOR

The principle of the invention is also applicable to the delivery of sheets singly after processing in any sort of machine such as a printing press, and piling them accurately on a suitable support. Such a structure is shown in Figs. 20 and 21. As there shown, a delivery board 300 has vacuum ports 301 spaced therealong adapted to cooperate with a perforated belt 302. The belt 302 is trained about guide sheaves 303, a driving sheave 304 and a tightener sheave 305. These parts are all arranged in about the same way as corresponding parts of previously described modifications. The application of vacuum to the ports 301 is controlled by a rotary valve 306 such as has been already described. The valve is driven through a reduction gear 307 by a chain and sprocket drive 308, in timed relation with the delivery of sheets to the left hand end of the board 300. Hold-down tapes 309 may be driven by any convenient means at the same speed as the belt 302. The drive for the latter is a constant speed drive.

Pile supporting frame members 310 are carried on a base 311 which may be the side frames of a printing press if the delivery is installed in connection with this particular type of sheet processing machine. A pile support 312 is suspended from the members 310 by cables and pulleys. Automatic lowering means for the support 312 include a ratchet wheel 313 adapted to be advanced periodically by pawl 314 on an oscillating crank 315. The ratchet wheel is geared to a shaft 316 through suitable reduction gearing (not shown) and the cables suspending the support 312 are wound on drums 317 on the shaft. The crank 315 is oscillated by a link 318, a bell crank 319 and a push rod 320. The latter is reciprocated by any suitable means in timed relation with the delivery of sheets.

Sheets delivered to the board 300 are moved therealong by the belt 302 because of the application of vacuum successively to the ports 301, thus serving to hold the leading edge of each sheet tightly against the traction belt. When the leading edge of the sheet reaches the end of the board 300, it is beyond the zone of the last vacuum port 301 and is thus free to move away from the belt. Deflector members 321 guide the sheets downwardly onto the pile as they are discharged from the end of the delivery board. The frame members 310 are provided with the usual jogger box 322 and operating mechanism therefor whereby the sheets are piled accurately and squarely.

It will be seen from the description of Figs. 20 and 21 that the travelling vacuum belt provides a very effective means for delivering sheets successively after processing to a pile support for stacking.

Fig. 24 is a diagrammatic showing of a modified form of feeder utilizing the principle of the invention. In this figure, as in Fig. 25 to be described later, parts are shown diagrammatically which have already been illustrated in detail. Fig. 24 shows a conveyor belt 360 adapted to feed sheets singly from a pile 361 to a press cylinder 362. The conveyor 360 may be a perforated traction belt traversing a feed board having vacuum ports therein or may be simply a plain endless belt. The pile 361 is stacked against bars 363 and is elevated as sheets are fed therefrom. Suction feet 364 are movable from the solid line to the dotted line position and back. An air jet is directed across the top of the pile by nozzles 365. The belt 360 is driven at a substantially constant speed which is considerably less than the peripheral speed of the cylinder 362.

The operation of the mechanism shown in Fig. 24 is as follows:

The suction feet 364 operate intermittently to lift the trailing end of the top sheet on the pile 361. When the trailing edge of the top sheet is lifted, the nozzles 35 blow air under the forward portion of the sheet and cause it to rise above the ends of the bars 363. The forward movement of the shoes 364 permits the leading edge of the sheet to be engaged by the conveyor belt 360. After the sheet has been engaged by the belt, it is pulled away from the shoes 364 and advanced toward the cylinder. The mechanism may be so designed and constructed that one sheet will be lifted from the pile and advanced to the conveyor before the trailing edge of the preceding sheet has cleared the bars 363. As a result, a plurality of sheets may be disposed in overlapped relation on the conveyor belt 360 at all times. By reason of this arrangement, the cylinder can be operated at high speed since each succeeding sheet has to travel only a relatively short distance to engage the drop guides and be positioned for engagement by the cylinder grippers.

Fig. 25 shows an arrangement similar to that of Fig. 24 except that the feeding of sheets from the pile 361 to the cylinder 362 is effected jointly by a plain conveyor belt 360 and a vacuum belt 367 similar to the perforated traction belts previously described. The operation of the mechanism of Fig. 25 is substantially the same as that of apparatus of Fig. 24.

Although I have illustrated and described herein but a preferred form of the invention with a modification, it will be understood that changes in the construction and operation disclosed may be made without departing from the spirit of the invention or the scope of the appended claims.

I claim:

1. Apparatus for successively conveying sheets from one processing machine such as a press to a second machine, said apparatus comprising a traction belt adapted to receive sheets from the first machine, means for driving said belt at a substantially constant speed approximately equal to that at which the sheet is delivered from said first machine, a second traction belt adapted to receive sheets from said first mentioned belt and deliver them to said second machine with the sheets lying substantially flat against the belt, and means for driving said second belt at variable speed whereby it moves at a speed at least as great as that of the first belt when the sheet passes from the first belt to the second and is first accelerated and then decelerated as the sheet approaches said second machine.

2. Apparatus for successively conveying sheets from one processing machine such as a press to a second machine, said apparatus comprising a traction belt adapted to receive sheets from the first machine, means for driving said belt at a substantially constant speed greater than that at which the sheet is delivered from the first machine, a second traction belt adapted to receive sheets from said first mentioned belt and deliver them to said second machine, and means for driving said second belt at variable speed whereby to decelerate the sheets as they approach said second machine.

3. Sheet conveying apparatus comprising means for guiding movement of a sheet, a traction belt movable along the path of said sheet, vacuum ports spaced along the belt, a second member similar to that already defined and disposed in line therewith, means for applying vacuum progressively to the ports of the members as points on their belts travel from one port to the next, means for driving the belt of said first member and said vacuum applying means at coordinated speeds, and means for driving the belt of the second member at a variable speed.

4. Sheet conveying apparatus as defined by claim 3, characterized by said members being mounted for pivotal movement about a common axis.

5. Sheet conveying apparatus as defined by claim 3 characterized by said first mentioned member having trunnions mounting it for tilting movement, said second mentioned member being mounted on side arms swingable about the axis of said trunnions.

6. Sheet conveying apparatus as defined by claim 3 characterized by said second member being secured to the first mentioned member, the latter being hinged to a support disposed laterally thereof.

7. Sheet conveying apparatus comprising means for guiding movement of a sheet, a traction belt movable along the path of the sheet, vacuum ports spaced along the belt, means for applying vacuum to said ports progressively as a point on said belt travels from one port to the next, and means for gradually reducing the intensity of the vacuum applied to one of said ports.

8. Sheet conveying apparatus comprising means for guiding movement of a sheet, a traction belt movable along the path of the sheet, vacuum ports spaced along said belt, means for applying vacuum to said ports progressively as a point on said belt travels from one port to the next, and means for arresting the sheet at a point in its path, a drive for said belt effective to decelerate without stopping it as a sheet approaches said point of arrest and means effective at about the same time for releasing the vacuum applied to one of said ports.

9. In a method of registering sheets, the steps including causing a sheet to engage a moving traction belt with the sheet lying substantially flat against the belt, decelerating the belt as the sheet approaches front registry position and partially releasing the sheet from the belt, arresting the sheet and continuing the movement of the belt so that it slips under the sheet to urge the sheet toward front registry position during side registry.

10. In the art of handling articles, the steps comprising moving articles sequentially forward at substantially constant speed and thereafter without altering the sequence of movement of the articles first accelerating and then decelerating the movement of each article and regulating such movement so that the article reaches a predetermined position while it is still urged forward but at minimum speed.

11. In the art of handling articles, the steps comprising moving articles sequentially forward at substantially constant speed and thus delivering them to a carrier and on said carrier first accelerating and then decelerating the movement of each article and regulating such movement so that the article reaches a predetermined position while it is still urged forward but at minimum speed.

12. In the art of handling sheets freshly printed on one side, the steps comprising moving such sheets sequentially forward at substantially constant speed by contact with unprinted portions thereof only and thereafter first accelerating and then decelerating the movement of each sheet and regulating such movement so that the sheet reaches a predetermined position while it is still urged forward but at minimum speed.

13. Sheet conveying apparatus comprising means for guiding movement of a sheet freshly printed on one side, a traction belt movable along the path of said sheet, means for delivering the sheet to the belt with the printed side of the sheet out of contact with the belt, vacuum ports spaced along the belt, means for applying vacuum to said ports progressively as a point on said belt travels from one port to the next whereby the sheet is caused to adhere to the belt, and means for driving said belt and said means at coordinated speeds.

14. Conveying mechanism comprising a pair of conveyors adapted to assume cooperative relationship to form a substantially continuous conveying path, said conveyors being mounted for pivotal movement about a common axis, at least one thereof intermediate its ends.

15. Conveying mechanism comprising a pair of conveyers adapted to assume cooperative relationship to form a substantially continuous conveying path, each of said conveyors comprising an endless conveying element, means for driving said conveying elements, one of said conveyors being mounted for pivotal movement about an axis intermediate its ends, the other of said conveyors having extension means whereby it is mounted for pivotal movement about said axis.

SAMUEL A. HUFFMAN.